Figure 1:
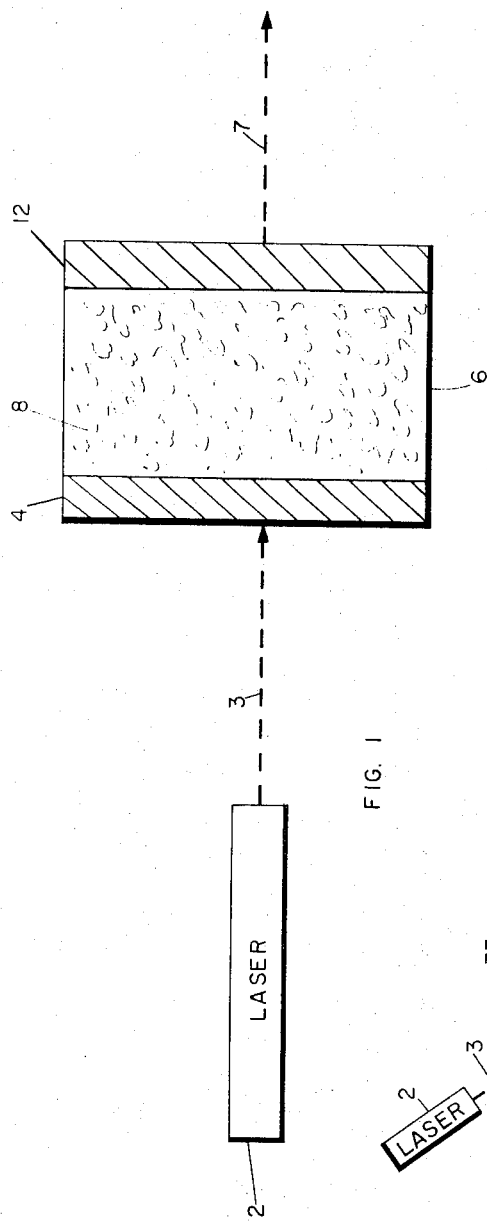

United States Patent [19]

Szoke

[11] 3,813,605

[45] May 28, 1974

[54] BISTABLE OPTICAL DEVICE

[75] Inventor: Abraham Szoke, Tel Aviv, Israel

[73] Assignee: Massachusetts Institute of Technology, Cambridge, Mass.

[22] Filed: Nov. 7, 1972

[21] Appl. No.: 304,493

Related U.S. Application Data

[62] Division of Ser. No. 93,548, Nov. 30, 1970, abandoned.

[52] U.S. Cl................ 330/4.3, 332/7.51, 350/160, 331/94.5
[51] Int. Cl............................................. H01s 3/05
[58] Field of Search............... 330/4.3; 332/7.51; 350/160; 307/312; 331/94.5 R, 94.5 M

[56] References Cited
UNITED STATES PATENTS 3,610,731   10/1971   Seidel ................................ 350/160
3,617,779   11/1971   Rosenberg ........................ 350/160

*Primary Examiner*—Maynard R. Wilbur
*Assistant Examiner*—N. Moskowitz
*Attorney, Agent, or Firm*—Arthur A. Smith, Jr.; Martin M. Santa; Robert Shaw

[57] ABSTRACT

A Fabry-Perot cavity containing a saturable absorber is placed in combination with a parallel monochromatic coherent light source, a laser, such that the light beam emitted by the laser impinges on a reflecting mirror of the cavity. For a certain range of laser intensities there are two possible values of the output of the Fabry-Perot cavity thereby forming a bi-stable optical device. This apparatus is utilized to generate short pulses with high peak power, to produce variable length optical pulses, and to perform logical operations including memory functions on optical signals.

2 Claims, 7 Drawing Figures

BISTABLE OPTICAL DEVICE

This is a division, of application Ser. No. 93,548, filed Nov. 30, 1970, now abandoned.

The invention herein described was made in the course of work performed for the Department of the Air Force and the Department of the Navy.

BACKGROUND OF THE INVENTION

1. Field of Invention

This invention relates generally to laser-optics technology. More specifically it relates to a bi-stable optical device having non-linear and hysteresis characteristics.

2. Prior Art

Short optical pulses are produced by Q switching or mode locking a laser. In Q switching, the energy stored in the laser medium inside the laser cavity is converted into optical energy by rotating a mirror or switching a Kerr cell, thereby producing a short optical pulse with high peak power. If a saturable absorber is inserted into the cavity, the buildup of the light inside the cavity is suppressed until the intensity is strong enough to bleach the absorber. This has the effect of sharpening the output pulse. One disadvantage of this method of generating short pulses with high peak power is the difficulty in changing and controlling the length of the pulse, which is dependent on laser gain, loss, pumping rate and mirror reflectivity.

In mode locking, if the proper concentration of saturable absorber is chosen, the cavity will transmit a series of spikes when the laser is pumped. This occurs because the fractional loss in the saturable absorber is less when the power is transmitted in short spikes. The envelope of the spikes is approximately that of the Q-switched pulse. The spacing between spikes is relatively large and the time duration of each spike is very small.

Short pulses can also be produced by a switchout or "cavity dumping" technique. The optical field intensity is built up inside the cavity in any of the above ways. Then at the peak of its intensity the light is switched out. One arrangement to do this is the following: In addition to a mode-locking dye cell and the laser medium, a Glan prism polarizer and a polarizing switch such as a Pockels or Kerr cell is inserted into the cavity formed by two highly reflective mirrors. Initially, a small amount of light transmitted from one mirror is used to trigger a high voltage pulser at a predetermined optical pulse amplitude. This, in turn, energizes the polarization switch. The polarization of the pulse is rotated 90°. The Glan prism prevents the propagation of the pulse with this polarization and the propagation direction of the pulse is redirected. The pulse stored in the cavity is suddenly "dumped." One drawback to this method is the expense of the external modulators and accompanying electronic circuitry.

Some logical operations have been performed in the prior art by a bi-stable optical element consisting of a laser amplifying medium and a saturable absorber in a common cavity. For a proper choice of medium the low light level absorption is higher than the low light level gain; and the high light level absorption is lower than the high light gain. Two stable states are created, one in which the laser is oscillating, and another in which it is not oscillating. Switching is done by saturating the absorber or changing the gain by injecting either or both of two other independent light beams into the side of the cavity, one impinging on the laser amplyfying medium, the other on the saturable absorber.

SUMMARY OF INVENTION

One object of the invention is an apparatus to produce short optical pulses with variable lengths with high peak power without the use of external modulators or independent light beams.

Another object of the invention is an apparatus which amplifies, inverts and functions with optical signals as a Schmidt trigger functions with electric signals.

A further object of applicant's invention is to create a bi-stable optical device which will perform logical and gating operations on optical signals.

These and other objects are met by an apparatus comprising a laser, with means of varying its output intensity, and a Fabry-Perot cavity containing a saturable absorber. The two elements are positioned such that the output beam emitted by the laser impinges upon a reflective mirror of the cavity.

Further objects, and a better understanding of the apparatus thereof will become more apparent with the following description taken in conjunction with the accompanying drawings.

DRAWINGS

FIG. 1 — A schematic diagram of the apparatus.

Figure 2:
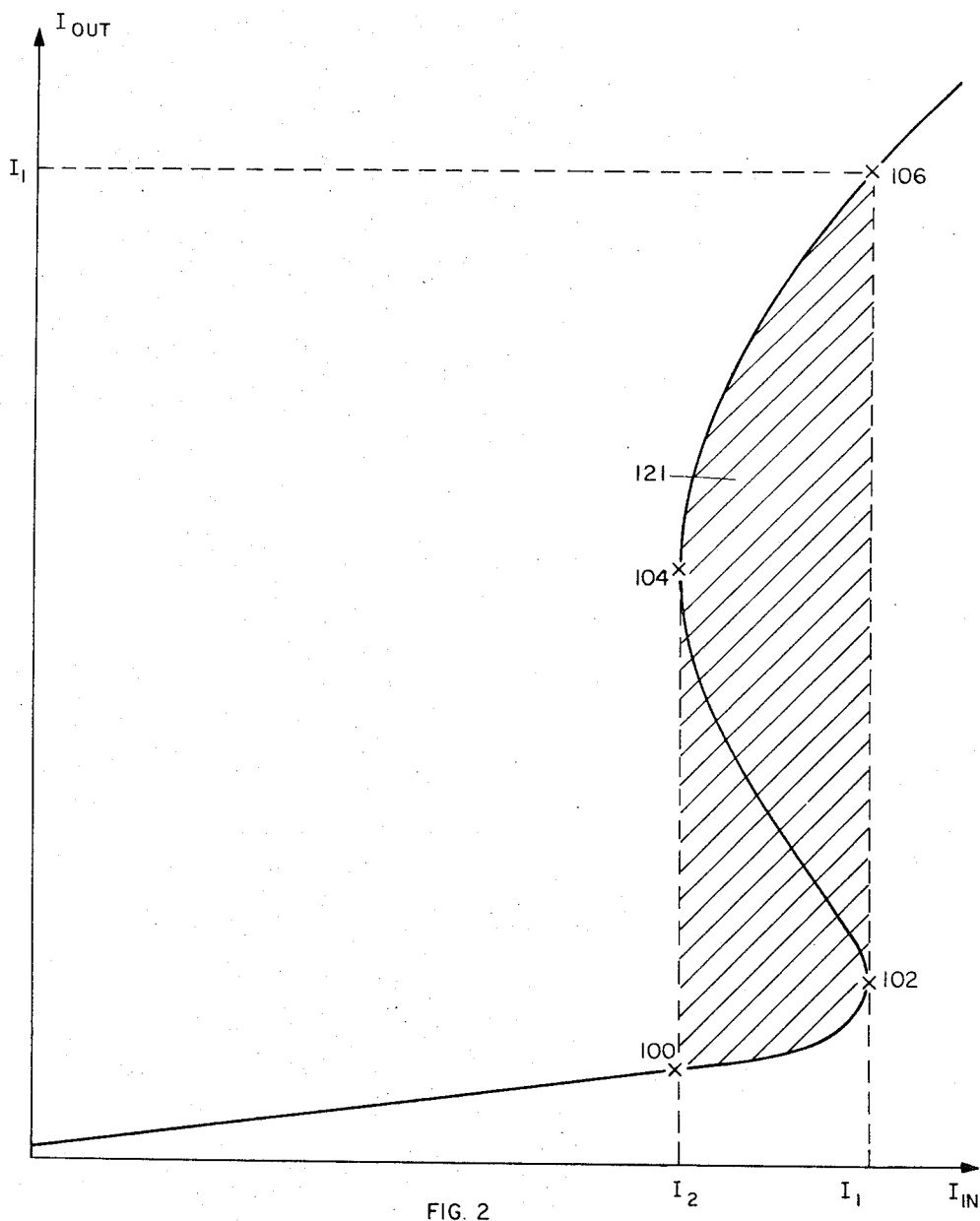

FIG. 2 — A graphical representation of the apparatus' operating characteristics.

Figure 3:
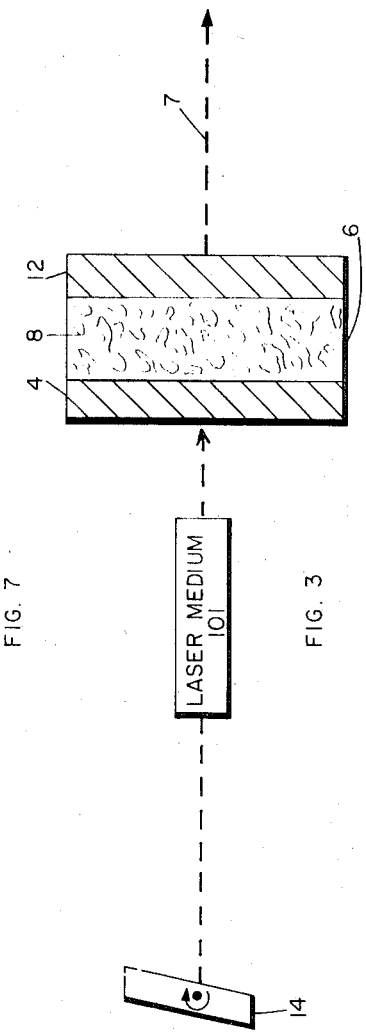

FIG. 3 — Schematic diagram of the apparatus used to produce short optical pulses with variable length.

Figure 4:
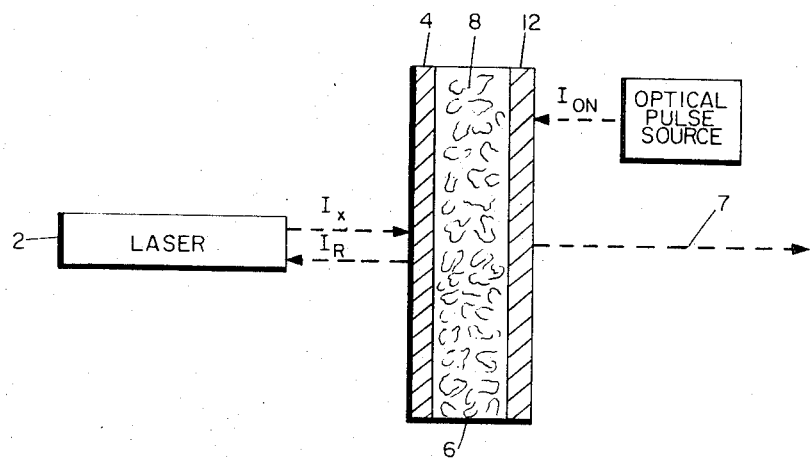

FIG. 4 — Schematic diagram of the operation of the apparatus acting as an optical light switch triggered by an optical pulse.

Figure 5:
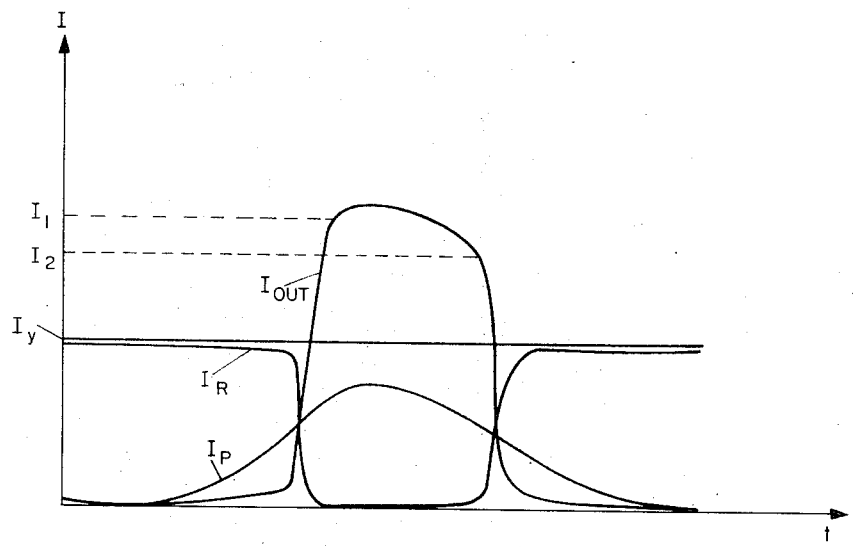

FIG. 5 — Graphical representation of the operating characteristics of the apparatus used as an optical amplifier inverter.

Figure 6:
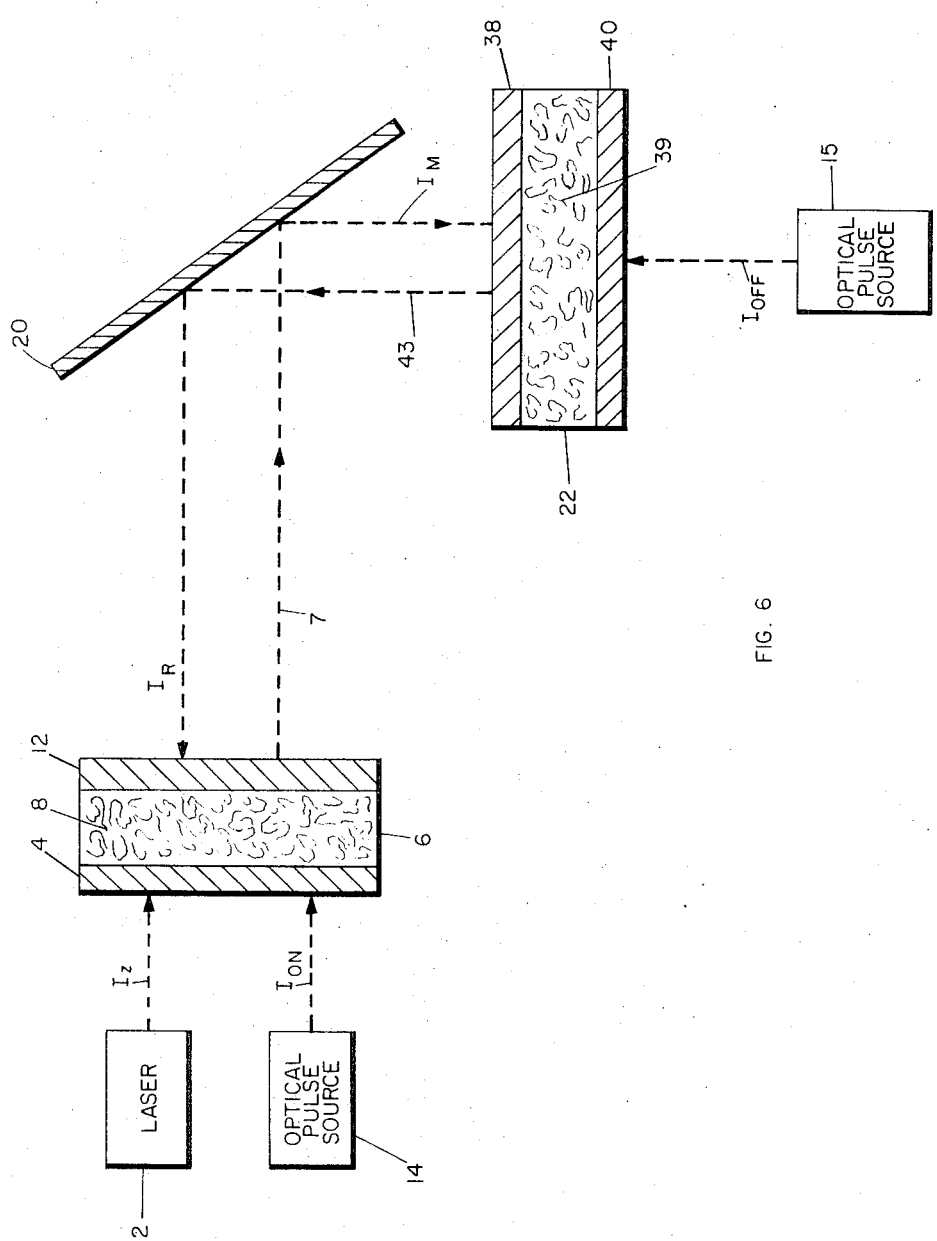

FIG. 6 — Schematic diagram of set up utilizing the apparatus to make an optical flip-flop circuit.

Figure 7:
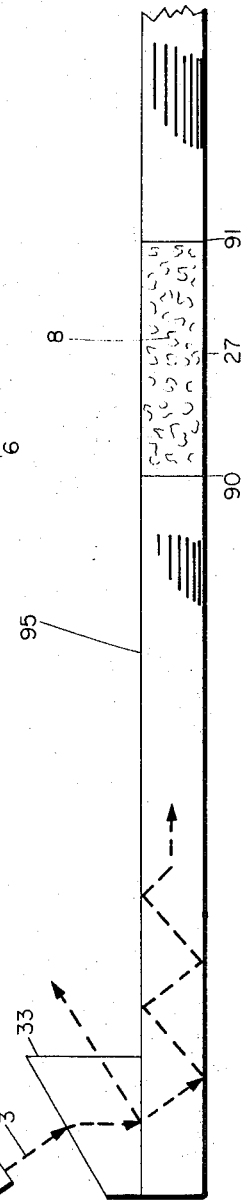

FIG. 7 — Schematic illustrating the apparatus in which the Fabry-Perot cavity is incorporated in a light pipe.

PREFERRED EMBODIMENT

A schematic diagram of the arrangement of the elements of the invention is illustrated in FIG. 1. A laser 2 is positioned such that its beam 3 impinges upon a reflecting mirror 4 of a Fabry-Perot cavity 6 which contains a saturable absorber 8, a second reflecting mirror 12, and has an output beam 7.

The invention may be understood more easily by initially describing its operation. The operating characteristics are illustrated in FIG. 2 by a graph of the intensity $I_{in}$ of the laser beam impinging upon a reflecting mirror of the Fabry-Perot cavity 6 versus intensity $I_{out}$ of output 7 of the Fabry-Perot cavity. If the input intensity $I_{in}$ is very low, $I_{out}$ will be very low, proportional to $I_{in}$. Physically very little light is transmitted.

If the input intensity $I_{in}$ is increased, the output intensity $I_{out}$ increases proportionally until $I_{in}$ reaches a certain value $I_1$. At this point, there is an avalanche in the transitions to the higher state. The saturable absorber becomes bleached and practically all the input intensity $I_{in}$ is transmitted by the cavity. The switching time between the states is very small.

In FIG. 2, the output intensity $I_{out}$ jumps from value 102 to value 106 equal approximately to $I_1$. As the input intensity is further increased, $I_{out}$ will approximately equal $I_{in}$; the cavity transmits practically all the input light.

If now the input intensity is decreased below $I_1$, the output will decrease accordingly, the cavity continuing to transmit all the input intensity. However, if $I_{in}$ is decreased to a value of $I_2$, the cavity discontinues transmitting, and the output intensity $I_{out}$ suddenly drops from a value 104 to a value 100.

Between $I_2$ and $I_1$, $I_{out}$ is double valued. It takes on values between point 100 and point 102 if the input intensity is increased from values less than $I_2$; and takes on values between point 106 and point 104 if $I_{in}$ is decreased from values greater than $I_1$. The cavity transmits very little light in the bistable region if the region is approached from the left, whereas if the region is approached from the right, i.e., decreasing intensities, the cavity continues to transmit essentially all the input. Between the points 102 and 104 the apparatus is unstable. In FIG. 2 the bistable region is the shaded area.

The physical characteristics of the invention determine the operating characteristics illustrated in FIG. 2. Specifically, the length of the cavity 6, defined as the separation distance between the mirrors; the reflectivity of the mirrors 4, 12; the choice of the absorber 8; and the concentration of the absorber 8, are all factors affecting the area of the bistable region. These variables are related by the dimensionless parameter $K_o = R - \alpha_o l / (1-R)$ where R represents the reflectivity of the mirrors 4, 12; $\alpha_o$ is the low light absorption coefficient of the saturable absorber 8; and $l$ is the distance between the mirrors. A bistable region exists for $K_o > 8$. Qualitatively, the bi-stable region will increase proportionately with the length of the cavity and the low level absorption coefficient. The low level absorption coefficient is in turn dependent on the physical characteristics of the absorber molecule and its concentration. A decrease in reflectivity of the mirrors will cause a decrease in the bi-stable region. In operating the apparatus, the cavity 6 must be tuned to resonance when the saturable absorber 8 is bleached. This is accomplished by adjusting the length of the cavity 6 within a distance corresponding to a wavelength of the laser beam 3. The means for changing the length are well known in the art dealing with Fabry-Perot cavities.

The particular type of laser is determined by the application. For example, if the apparatus is to be operated in a steady state condition as in producing an optical step response, a CW He-Ne laser might be suitable. As will be seen later, if the apparatus is to be operated in a pulsed mode for producing high power short pulses, a $CO_2$ Q-switched gas laser or pulsed solid state lasers might be appropriate.

The following examples will illustrate the operation and use of the invention.

Short optical pulses of variable length may be generated by using the apparatus to cavity dump. FIG. 3 illustrates a schematic set-up for this application. Typically, the laser might be a $CO_2$ gas laser operating on the $10.6\mu$ wavelength with $SF_6$ gas as the saturable absorber 8 in cavity 6 at a pressure of one torr. One mirror 4 of the Fabry-Perot cavity 6 acts as the stationary mirror of the laser cavity. The laser medium 101 is pumped and Q-switching is initiated by rotating mirror 14. When the intensity in the laser medium builds up to $I_1$, there is a sudden transmission through the cavity and a pulse is produced in output 7 with a physical length of twice the laser cavity length, said length being the distance between rotating mirror 14 and reflecting mirror 4 of cavity 6. Hence, by controlling the length of the laser cavity, an easy method of producing optical pulses of variable length is obtained without the use of expensive external modulators. This was difficult to accomplish by the prior Q-switching art due to the dependence of pulse width on laser gain, loss, pumping rate and mirror reflectivity.

FIG. 4 illustrates the operation of the apparatus as an optical light switch, or in a sense as an optical step function generator. Here, we start with a constant input intensity $I_X$ of the laser beam within the bistable region such that: $I_2 < I_X < I_1$. Initially, most of the light $I_R$ is being reflected from the mirror 4 of the cavity 6, that is $I_R \approx I_X$. If now a pulse from an optical pulse source of magnitude $I_{on}$, where $I_{on} + I_X > I_1$ is introduced into the cavity, the total input intensity into cavity 6 is greater than $I_1$, and the saturable absorber is switched into its higher state. The cavity thereupon transmits and will continue to transmit, since the higher state is stable, all the input intensity $I_X$. Therefore, the intensity $I_{out}$ of the output 7 will be approximately equal to $I_X$.

The apparatus may be used as an optical amplifier-inverter. The input intensity which will be designated $I_y$ from the laser is set to the left of the bistable region. That is, $I_y$ is less than $I_2$. In this state, $I_R$, the reflected light from the first mirror 4 is nearly equal to the intensity of the laser beam $I_y$. A slow pulse $I_p$ of magnitude $I_p + I_y > I_1$ is introduced into the cavity.

The pulses of $I_R$, $I_p$, $I_{out}$ are illustrated graphically in FIG. 5 as functions of time. When the combined intensity of $I_y + I_p$ become greater than $I_1$, the apparatus transmits and continues to do so until the combined light intensity decreases to $I_2$. During this period of transmission, $I_R$ goes to nearly zero, producing an inverse pulse. These operating characteristics with optical signals are similar to those of a Schmidt trigger with electric signals.

A physical set up of an optical flip flop utilizing the invention and a Fabry-Perot cavity is illustrated in FIG. 6. A steady beam of intensity $I_z$ from the laser 2 is adjusted so that $I_z$ is less then $I_2$. $I_z$ impinges on mirror 4 of cavity 6. No light is transmitted through the cavity. If now a pulse $I_{on}$ from optical pulse source 14, such that $I_{on} + I_z > I_1$ is introduced into the cavity, the cavity will switch into its higher state and begin to transmit. The output beam 7 is reflected from a partially reflecting mirror 20 onto a reflecting mirror 38 of the Fabry-Perot cavity 22 filled with a saturable absorber 39. If cavity 22 does not transmit, mirror 38 will reflect the beam which will in turn be reflected by mirror 20 and impinge on mirror 12 of cavity 6 with an intensity which is designated as $I_R$ in FIG. 6. Now if $I_z + I_R > I_2$, cavity 6 will continue to transmit. Since $I_R$ cannot be greater than $I_z$, $I_z$ must initially be equal to or greater than one half $I_2$.

The purpose of mirror 20 is two-fold. First, by being partially reflecting, use may be made of the transmitted signals. Second, it is a means of contolling the intensity of the beams it reflects. In the above paragraph, it was assumed that Fabry-Perot cavity 22 did not transmit the reflected output beam 7. Whether or not cavity 22 transmits is dependent on the intensity $I_m$ of the reflected beam 7 and the physical parameters of the cavity 22. The reflectivity of mirror 20 determines the intensity $I_m$ of reflected beam 7 and also the intensity $I_R$ of the reflected beam 43 from mirror 38.

If, when cavity 6 is transmitting and cavity 22 is not transmitting, a pulse $I_{off}$ from optical pulse source 15 with magnitude such that the sum of $I_{off}$ and $I_m$ is sufficient to initiate transmission of cavity 22 is introduced into cavity 22, then cavity 22 will transmit $I_m$ and the intensity of beam 43 will go nearly to zero. Since $I_z$ is less than $I_2$, cavity 6 will cease to transmit. Thus, a signal pulse $I_{on}$ introduced into cavity 6 produces a steady output beam 7 and another signal pulse $I_{off}$ introduced into cavity 22 turns output beam 7 off.

FIG. 7 illustrates a variation of the form of the invention, but the teachings are the same. The output beam 3 of the laser is coupled into a light pipe 95 by prism 33 with standard techniques. The light pipe 95 is optically cleaved in two places, 90,91, and the resulting section 27 is impregnated with a saturable absorber 8. The interfaces 90,91 function as highly reflective mirrors and the section 27 acts as the Fabry-Perot cavity. The choice of an absorber 8, the length of the section 27, and the concentration of the absorber are determined in accordance with the above teachings.

A further variation would be the use of dielectric waveguides containing a channel surrounded by a region with a different index of refraction. These are common and useful in miniature laser circuitry.

What is claimed is:

1. An apparatus for producing short optical pulses with high peak power of a predetermined desired length comprising:
   a laser amplifying medium,
   a first cavity comprising two parallel highly reflective surfaces with reflectivity R and separated by a distance $l$,
   a saturable absorber between said parallel reflective surfaces, said absorber having a low level absorption coefficient $\alpha o$, said $\alpha o$ satisfying the equation $R\alpha o l/(1-R) > 8$,
   a laser cavity containing said amplifying medium, said laser cavity being comprised of another highly reflective surface and the reflective surface of said first cavity nearest said laser amplifying medium, said surfaces being separated by a distance equal to one half the desired length of said pulse to be produced,
   means for Q-switching said laser cavity.

2. The apparatus of claim 1 wherein said first cavity is a Fabry-Perot cavity.

* * * * *